May 4, 1937.  A. LYSHOLM  2,078,956
GAS TURBINE SYSTEM
Filed March 13, 1934  3 Sheets—Sheet 1

INVENTOR
Alf Lysholm
BY
his ATTORNEY

May 4, 1937.   A. LYSHOLM   2,078,956
GAS TURBINE SYSTEM
Filed March 13, 1934   3 Sheets-Sheet 3

INVENTOR
Alf Lysholm
BY
his ATTORNEY

Patented May 4, 1937

2,078,956

UNITED STATES PATENT OFFICE 2,078,956

GAS TURBINE SYSTEM

Alf Lysholm, Stockholm, Sweden, assignor to Aktiebolaget Milo, Stockholm, Sweden, a corporation of Sweden Application March 13, 1934, Serial No. 715,267 In Germany March 24, 1930

6 Claims. (Cl. 60—41)

This application is a continuation in part replacing my application Serial No. 523,296, filed March 17, 1931, and with respect to common subject matter relates back to said application Serial No. 523,296 for all dates and rights incident to the filing thereof and of the applications in foreign countries corresponding thereto.

The present invention relates to gas turbine systems and has particular reference to gas turbine systems operating in accordance with what is commonly known as the constant pressure cycle, as distinguished from the explosion cycle.

For many years a solution has been sought for the problem of directly utilizing in a prime mover the heat of gases produced by combustion, in order to avoid the complications and cost of apparatus necessary for the development of power with the usual steam boiler and engine or turbine.

Heretofore, however, all efforts to provide a gas turbine system of the constant pressure type having sufficiently high thermal efficiency to be of practical utility have proved futile, largely because of the failure of those attempting to develop this type of apparatus to appreciate the importance of the thermo-dynamic efficiency of the turbine apparatus, as compared with the importance of other factors such as the total heat drop of the motive fluid in the system, in determining the thermal efficiency of the system as a whole. In the course of the prior development of the gas turbine art, exaggerated importance has been given to the securing of a very high total heat drop of motive fluid and of other factors which have necessitated sacrifice of high thermo-dynamic turbine efficiency. Study of the chronological development of this art discloses the fact that the constant pressure type of gas turbine system, concededly the most desirable from the mechanical standpoint because of its relative simplicity, was the first type to be the subject of serious investigation and development, and that this type has, as a result of the work which has been done upon it by those having a real appreciation of the very difficult problems involved, been relegated to the background as wholly impractical in favor of the more complicated explosion type of apparatus.

In accordance with the present invention, however, I propose to make use of the previously condemned constant pressure type of system, and in order to provide such a system that is capable of being embodied in practical apparatus operable with sufficiently high overall thermal efficiency to be of commercial utility, I proceed from a basic concept wholly different from those upon which the developments of the prior art have been based.

Broadly, it may be stated that the fundamental concept of the present invention is the provision of a constant pressure gas turbine system of which the cornerstone is a turbine or turbines having high thermo-dynamic efficiency and in which all other factors in the system inimical to the securing of high thermo-dynamic turbine efficiency are subordinated to or modified as compared with prior practice to a degree such that they do not interfere with the securing of such high turbine efficiency. By high thermo-dynamic turbine efficiency I mean an efficiency which is high in terms of present steam turbine efficiency, that is, at least 80% and preferably higher, for example, 85 to 90%, which efficiencies are obtainable with known kinds of steam turbines. At the same time, I recognize that even with high turbine efficiency, a relatively large temperature drop of the motive fluid in passing through the system must occur if an acceptable overall thermal efficiency is to be obtained, which in turn necessitates an initial gas temperature of relatively high value as compared with the initial temperature of steam as ordinarily supplied to even very highly efficient steam turbines. Consequently I provide a gas turbine system in which the initial gas temperature—and by this term I mean the temperature of the gas as it is delivered for initial expansion in a turbine—is at least 800° C. absolute and is preferably above this temperature but not above a temperature such that moving turbine blading can be continuously exposed to it without premature failure. In other words, and taking into consideration the temperature and mechanical stress-resisting characteristics of present materials that are not prohibitively expensive, it may be said that I propose to employ gas for motive fluid which has an initial temperature within a range of which the lower limit is at least 800° C. absolute and of which the upper limit is of the order of 1000° C. absolute.

The utilization of motive fluid comprising gases of combustion having an initial temperature within the range mentioned above in turbine apparatus which is practical and which furthermore has a sufficiently high thermo-dynamic efficiency presents problems the solutions for which I have found to require the production and utilization of the motive fluid in accordance with principles different from those heretofore considered in the gas turbine art as the only ones affording a possible solution, and the utilization of turbine apparatus having definite structural characteristics which in certain respects differ distinctly from steam turbine apparatus of the same general character.

I shall explain more in detail the nature of the problems involved and the manner of their solution by the present invention in connection with the following description of gas turbine systems typical of the invention. It will be understood, however, that the systems hereinafter described in conjunction with the accompanying drawings forming a part of this specification, have been chosen only by way of example. The invention is capable of being incorporated in gas turbine systems of widely different design and arrangement of component parts, depending upon the purpose and conditions of service of individual systems, and is accordingly to be considered as embracing all that may fall within the scope of the appended claims, in which the invention is defined.

Figure 1:
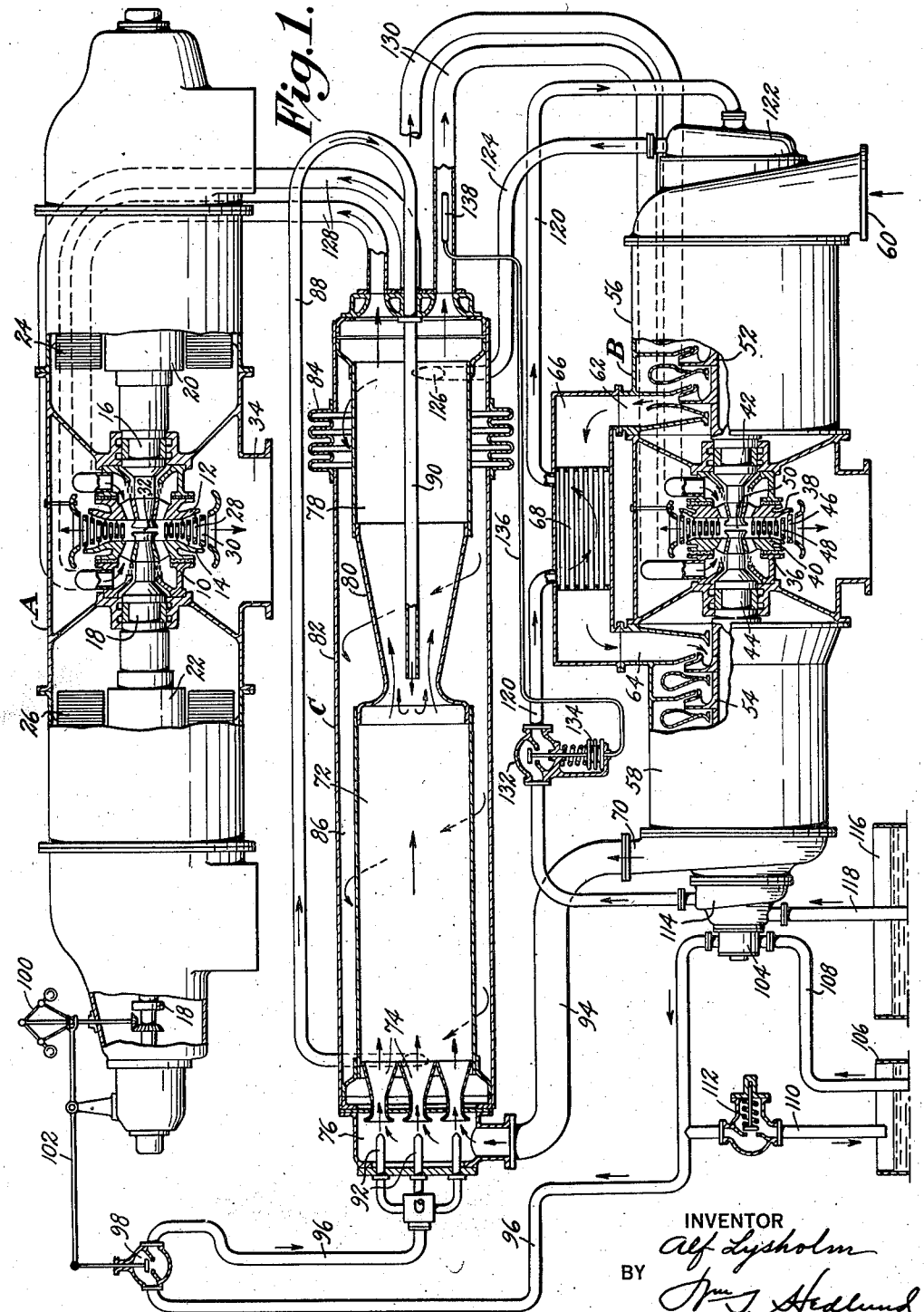
Fig. 1 is a more or less diagrammatic view, partly in section, of one form of gas turbine system embodying the invention.

Referring now to the drawings, Fig. 1 illustrates a gas turbine system providing a stationary power plant for producing useful power in the form of electric energy.

The primary component parts of the system comprise a turbo-generator designated generally at A, a turbo-compressor designated generally at B, and a heating device designated generally at C, for producing gaseous motive fluid for operating the turbines of the system.

The turbo-generator A comprises a turbine 10 which may be termed a power output turbine since it develops the net useful power produced by the system. In the embodiment illustrated the turbine is of the radial flow double rotation type comprising rotors 12 and 14 overhung respectively on the ends of the shafts 16 and 18, which carry the rotors 20 and 22 of the electric generator parts 24 and 26, which deliver the energy produced in the system. The turbine rotors 12 and 14 carry respectively a plurality of rows of turbine blades 28 and 30, providing a path of flow for expansion of gaseous motive fluid in radial direction from a central admission chamber 32 to the outlet chamber 34 of the turbine. The turbine blading comprises the rows of blades 28 and 30 and is of the reaction type, and full admission of motive fluid from the central inlet chamber 32 to the first row of turbine blades is employed. The importance and the bearing of the use of this kind of blading and of this character of admission will be explained later.

The turbo-compressor B in the embodiment shown consists of a radial flow double rotation turbine 36 similar to the power output turbine 10, and comprises rotors 38 and 40 overhung on the ends of shafts 42 and 44. The rotors 38 and 40 carry respectively the rows of blades 46 and 48, which are also of the reaction type and which provide a radial path of flow for expansion of motive fluid admitted to the blading by full admission from the central inlet chamber 50.

Shafts 42 and 44 carry respectively the rotors 52 and 54 of the compressor sections 56 and 58. Atmospheric air is admitted to section 56 through the inlet 60, and the outlet 62 of this section is connected to the inlet 64 of the high pressure compressor section 58 by way of a conduit 66 in which is advantageously located a cooler 68 of the surface or non-contact type. Compressed air at final pressure is delivered from the compressor section 58 at the outlet 70.

The heating device C comprises an inner combustion chamber 72, at one end of which is located a plurality of inlet nozzles 74, the inlet ends of which are in communication with a chamber 76 located at the end of the heating device. The opposite end of the combustion chamber 72 is in communication with a chamber 78 and the inner casing 80 forming chambers 72 and 78 is surrounded by an outer casing 82, which advantageously includes an expansion section 84. A jacket space 86 is provided between the inner and outer casings, and the portion of the jacket space adjacent to the inlet nozzles 74 communicates by way of a conduit 88 with an injection pipe 90 extending through the chamber 78 to a place adjacent the end of the combustion chamber 72. A plurality of fuel nozzles 92 extend into chamber 76 and register with the inlet openings of the inlet nozzles 74. The outlet 70 of the compressor section 58 is placed in communication with chamber 76 by a conduit 94. Fuel is supplied to nozzles 92 through the fuel supply conduit 96 in which is located the control valve 98. The position of valve 98 is governed from the turbo-generator A, and is advantageously controlled by means of a centrifugal governor 100 driven from shaft 18 or an extension thereof, the governor and the valve being connected by suitable linkage such as the lever 102, arranged so that upon increase in speed of the turbine shaft, the fuel valve is moved toward closed position. Fuel may, of course, be supplied to the conduit 96 in any suitable manner. In the embodiment illustrated it is supplied from a pump 104, driven from the compressor shaft 44. Pump 104 draws fuel from the supply reservoir indicated at 106 through the suction pipe 108, and the supply conduit 96 on the delivery side of the pump is provided with a by-pass conduit 110 controlled by the spring loaded relief valve 112. Pump 104, in conjunction with the loaded by-pass, serves to maintain substantially constant fuel pressure in the supply conduit 96. A pump 114, advantageously driven from the compressor turbine shaft 44, draws water from a reservoir 116 through the suction pipe 118 and delivers it through the conduit 120 to a second pump 122, advantageously driven by the compressor shaft 42. In passing to pump 122, the water flows through the heat exchanger or cooler 68 located in the conduit connecting the two compressor sections. The outlet of pump 122 is connected by conduit 124 to the jacket space 86 of the heating device, preferably through a tangential connection indicated at 126. The end of chamber 78 remote from the combustion chamber 72 is placed in communication with the admission chamber 32 of the turbine 10 by means of conduits 128, and the admission chamber 50 of the compressor turbine 36 is placed in communication with this chamber by means of similar conduits 130.

The water pumps 114 and 122 may advantageously be of the centrifugal type, and in the embodiment illustrated the amount of water delivered by these pumps is controlled by means of valve 132 located in the conduit 120 and arranged to be opened by an expansible element 134 connected by tube 136 to a thermostatic element 138 located in the path of fluid delivered from the heating device.

The normal operation of the system is as follows: air is compressed successively in the compressor sections 56 and 58 and is delivered to the chamber 76 of the heating device at the desired pressure at which the system is intended to operate. The compressed air, together with fuel from the nozzles 92, passes to the combustion chamber 72 where the gaseous motive fluid is produced at constant pressure by internal combustion of the fuel. Water delivered from pump 122 and preheated by passing through the cooler 68 passes through the jacket space 86 of the heating device in the direction indicated by the arrows, and is injected from the injection pipe 90 into the combustion gases flowing from the chamber 72 to produce gaseous motive fluid at the temperature desired for utilization in the turbines of the system. When, as in the present embodiment, water is injected into the combustion gases, it is of course converted into steam and the resulting fluid mixture is one containing gases of combustion and steam. This mixture will hereinafter be considered and referred to as gas or gaseous motive fluid. From the heating device the gaseous motive fluid flows through conduits 128 and 130 to turbines 10 and 36 respectively, in which turbines it is expanded to produce the work required to operate the compressor and the generator. If the load on the plant varies the tendency of the generator turbine to slow down or speed up will alter the position of the fuel control valve 98 and cause a corresponding increase or decrease in the amount of fuel admitted to the heating device. This constitutes the primary control for the system. As previously pointed out, it is of primary importance in accordance with the present invention that the motive fluid be supplied to the turbine or turbines of the system for expansion from an initial temperature that is within a predetermined range of values. In the present embodiment, control of the temperature is effected by controlling the amount of water injected into the heating device. It will be evident that increasing the amount of water injected will tend to reduce the temperature of the motive fluid because of the heat required to vaporize the water. In the present embodiment both the fuel and water controls are automatic in operation, but it will be evident that in a large plant, where operators are in constant attendance, the controls may be manual.

Figure 2:
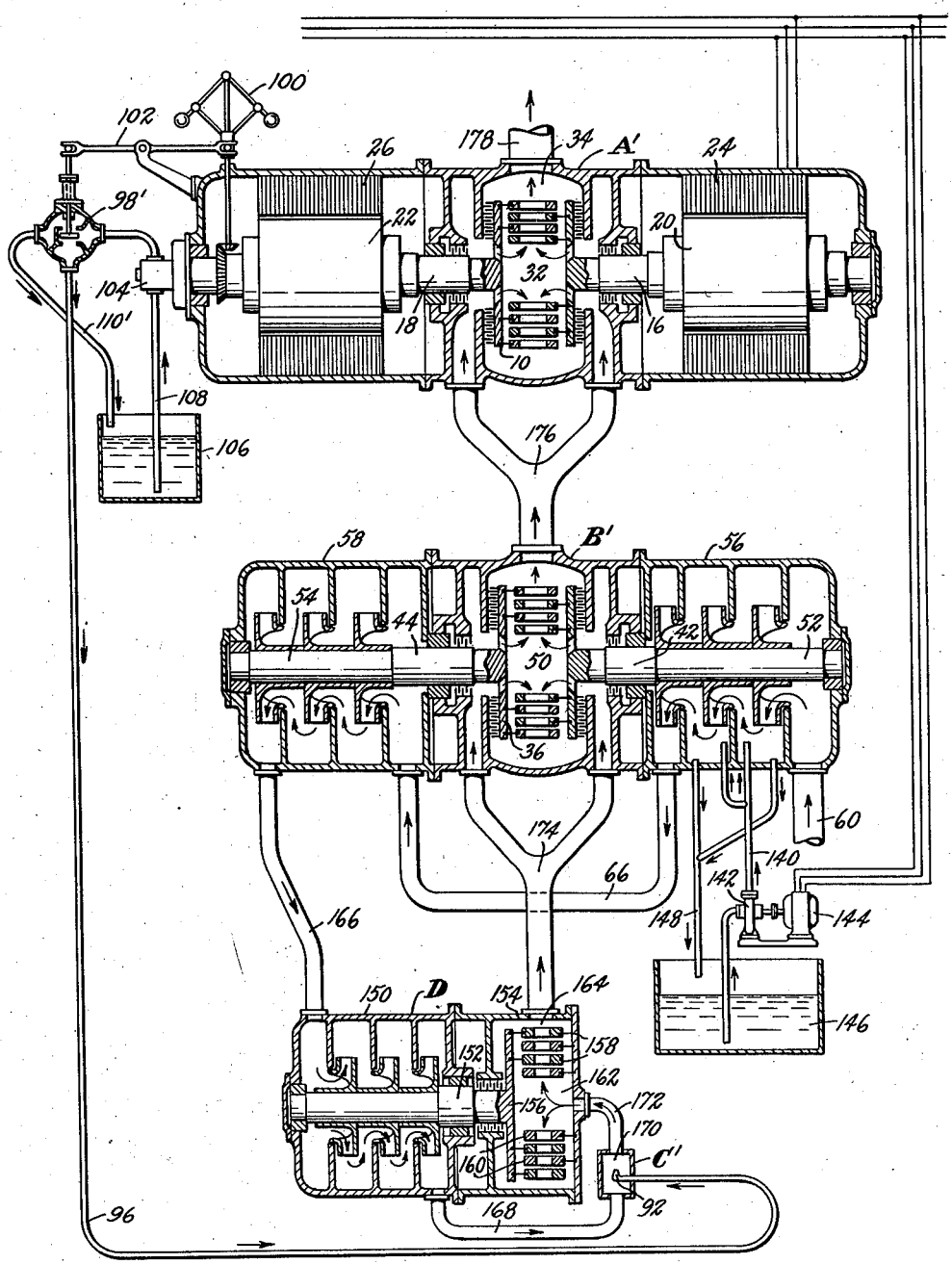
Fig. 2 is a similar view of another form of system embodying the invention.

In Fig. 2, I have illustrated another gas turbine system in which the arrangement of the primary component parts is somewhat different than that shown in Fig. 1. In the present arrangement the useful power is derived from a turbo-generator A', the principal parts of which are similar to those already described in connection with the turbo-generator A shown in Fig. 1, and in which corresponding parts are designated by corresponding reference numerals. It is not believed to be necessary to again describe this structure in detail. The compressor means in this embodiment comprises a turbo-compressor B' similar to the turbo-compressor B illustrated in Fig. 1 and a turbo-compressor D for further compressing air delivered from the compressor unit B'. The turbo-compressor B' consists of the double rotation radial flow turbine 36, and the shafts 42 and 44, which carry the rotors 52 and 54 of the respective compressor sections 56 and 58. Air is drawn into the inlet 60 of the section 56 and is delivered through the conduit 66 in the outlet of this section to the inlet of the section 58 which, in this embodiment, constitutes an intermediate pressure compressor section. In this embodiment the surface cooler between the compressor sections is omitted and cooling of the air during compression is effected by direct injection of a limited quantity of water through the conduit 140. Water may advantageously be supplied to conduit 140 from a pump 142 which may be driven as indicated from an electric motor 144. Excess water from the compressor returns to the supply reservoir indicated at 146 through suitable drain pipes 148.

The compressor unit D comprises a compressor section 150 the rotor of which is carried by shaft 152. The turbine 154 for driving this shaft is in this embodiment a radial flow turbine of the single rotation type having a rotor 156 overhung on the end of shaft 152. Rotor 156 carries a plurality of moving blade rings 158 cooperating with a plurality of rows of fixed turbine blades 160 to provide a path for radial expansion of motive fluid from the central inlet chamber 162 to the space 164 of the turbine. The air compressed in the compressor section 58 is delivered through conduit 166 to the high pressure compressor section 150, from which it passes through the conduit 168 to the heating device indicated diagrammatically at C', and providing a combustion chamber 170. Fuel from the supply pipe 96 is delivered to the combustion chamber 170 through a suitable injection nozzle 92 and control of the amount of fuel supplied to the combustion chamber is effected by means of a control valve 98', which is in turn governed by the governor 100 driven from the turbine shaft 18. Valve 98' receives fuel from the fuel pump 104, and excess fuel from the pump is returned through the by-pass or return conduit 110', which corresponds in function to the conduit 110 shown in Fig. 1.

The outlet of the combustion chamber 170 is connected to the central admission chamber 162 of turbine 154 by means of conduit 172, and the outlet of turbine 154 is connected by means of conduit 174, having suitable branches, to the central admission space 50 of turbine 36. The outlet or exhaust space of turbine 36 is connected by means of a conduit 176 with the central admission chamber 32 of the power output turbine 10, and the outlet space 34 in the turbine 10 is connected to the final exhaust conduit 178.

Both of the systems hereinbefore described embody the essential features of the present invention, and the differences serve to illustrate the possibilities for modifying the invention in systems in which the several primary component parts are differently arranged, and in which different means are employed to produce motive fluid of the desired characteristics.

In the system shown in Fig. 2, three compressor stages are employed, the system being adapted to operate at higher pressure than the system shown in Fig. 1. Also, in Fig. 2, the turbines are connected so that the motive fluid is successively expanded in the different turbines, the turbine of the high pressure compressor unit being utilized as a high pressure turbine, that of the compressor unit B' being utilized as an intermediate pressure turbine, and that of the turbo-generator unit A' being utilized as a low pressure turbine. This arrangement of the turbines provides a system which is better suited for substantially constant or base-load operation than for variable load operation.

The system shown in Fig. 1, in which the compressor and power output turbines are connected in parallel with respect to flow of motive fluid from the combustion chamber to exhaust is better adapted for operation under varying load conditions than is the system shown in Fig. 2.

It will be observed that in the system shown in Fig. 2 water is not injected into the combustion gases as in the system shown in Fig. 1. The injection of water is not essential to the present invention, and the employment of water injection will be determined in individual cases by the character of the conditions of operation of the system. In systems of the kind shown in Fig. 2, in which injection of water into the combustion gases is not employed, the compressor capacity is sufficient to provide a considerable quantity of excess air over and above that required for the combustion of the amount of fuel required for normal full-load operation of the system. This excess air serves to prevent the initial temperature of the motive fluid from exceeding the maximum value of the predetermined temperature range and control of the fuel supply to the combustion chamber will serve to maintain the temperature within the desired limits.

Considering now those features of the above described systems which are common to both, and which constitute the most important features of the present invention, it is first necessary to explain the principal factors involved in reaching a solution of the problem of providing an operative system of the character described that will operate with a degree of thermal efficiency sufficiently high to make the system commercially useful, and which may be embodied in commercially practicable apparatus. In order to obtain the high thermo-dynamic efficiency for the turbine system as a whole which, as previously pointed out, constitutes the cornerstone of the present invention, reaction blading should be used, since the efficiency obtainable with impulse blading systems is decidedly lower. Moreover, it is necessary, in order to obtain the desired high thermo-dynamic efficiency, to utilize multiple stage expansion employing a relatively large number of stages in which a relatively small heat drop is effected per stage. In other words, it may be said that multiple stage blading is required. Furthermore, in order to obtain the high overall thermo-dynamic efficiency required by the present invention, relatively high efficiency must be obtained in the first stages of the expansion. The reason for this is that in the relatively low temperature stages adjacent the exhaust end of the turbine system, the maximum efficiency obtainable is not sufficiently greater than the overall efficiency required for the turbine system as a whole, to permit the use of low efficiency blading in the first stages. To most advantageously carry the present invention into effect, the first few stages in which the motive fluid is expanded from initial temperature should operate with an efficiency of at least 75% and the efficiency of these stages is preferably above this figure. Since relatively high efficiency blading is required at the inlet end of the turbine system, it follows that the heat drop of the motive fluid in the stages at and adjacent to the inlet end of the system must be relatively small. This in turn means that the blading, including the rows of moving blades which are subject to mechanical stresses as well as temperature stresses must be operated at temperatures approximating the initial temperature of the motive fluid.

A further requirement for turbines having the required high thermo-dynamic efficiency is that they be constructed for operation with a Parsons figure of relatively high value. The Parsons figure of a turbine is an arbitrary value which is recognized as determinative of the efficiency of the turbine (Lowenstein's Translation, Stodola, Steam and Gasc Turbines, 6th ed., vol 1, p. 254). The Parsons figure is determined by the sum of the squares of the blade speeds of the stages of the turbine divided by the adiabatic heat drop of the motive fluid in passing through the turbine. For pure reaction turbine blading the value of the Parsons figure, when expressed in metric units, at which maximum efficiency can be obtained is approximately 3800. For impulse blading the corresponding value of the Parsons figure is in the neighborhood of 1800. As will hereinafter be more fully explained, I provide, in accordance with the present invention, turbine structure having a relatively high Parsons figure. The specific value of this figure may vary within the scope of the invention in different systems, but it is preferably within the range of values between a minimum of approximately 2800 and a maximum corresponding to that for the maximum theoretically obtainable efficiency with reaction blading. I consider most advantageous a Parsons figure of the order of 3000, that is, for example, within the range of 3000 to 3500.

If the number of turbine stages is to be maintained at a low enough value to provide practical turbine apparatus of commercial utility and at the same time a sufficiently high value is to be obtained for the Parsons figure, the turbine blade system must be constructed to provide a relatively high value for the blade speeds. This necessitates relatively high speeds of operation and consequently relatively high mechanical stresses on the moving blades due to centrifugal force. This requisite for the turbine structure, coupled with the fact that the motive fluid at the inlet end of the blading system is at relatively high temperature in a number of the turbine stages, presents a difficult problem in the provision of suitable turbine structure.

In accordance with the present invention, I overcome the difficulty presented by the above described circumstances by employing turbine structure in which a path of flow for expansion of motive fluid is provided having a substantial component of flow in radial direction. By providing this kind of flow path I am enabled to make the rows of turbine blading adjacent to the inlet of the system of relatively small diameter, and this minimizes the mechanical stresses on those blade rows which are subjected to maximum temperature stresses. At the same time, due to the relatively very much larger diameters of the stages adjacent the outlet end of the system, which stages are subjected only to relatively low temperature stresses, I am enabled to retain a sufficiently high sum of the squares of the blade speeds in the turbine system as a whole to provide a Parsons figure of the requisite high value.

For the purposes of achieving the objects of the present invention, the radial flow turbine is of particular advantage, and the double rotation radial flow turbine is furthermore particularly advantageous because of the fact that when considering the blade speeds determinative of the Parsons figure, the speed of a given blade row is considered relative to the speed of the immediately adjacent blade row. Since in the double rotation radial flow turbine the speed of a given blade row for purposes of determining the Parsons figure is ordinarily twice the absolute speed of the blade row, it will be evident that with the double rotation turbine a given Parsons figure may be obtained with blading having a much lower absolute speed than would be the case with a single rotation turbine. Consequently, very much lower mechanical stresses are involved when a double rotation turbine is employed. The necessity for employing blade rows of relatively small diameter for initial expansion of motive fluid of the character produced in accordance with the present invention involves a further difficulty due to the fact that the specific heat of gaseous motive fluid is very much lower than the specific heat of steam. Consequently, in order to obtain a given quantity of potential energy in gaseous motive fluid it is necessary to provide a very much larger quantity of such motive fluid than would be the case if steam were employed. Therefore, in spite of the relatively small diameter of the inlet portion of the turbine blading system relatively large quantities of motive fluid must be expanded. In order to handle the quantities of motive fluid required I employ full admission of fluid to the blading system of the turbine, and because of the fact that this admission is to an initial blade row of relatively small diameter as compared with the diameters of the ensuing rows, it may be said that I employ central full admission. In meeting the requirement for central full admission, a radial flow turbine of the type in which flow is radially outwardly of the turbine is particularly advantageous, since it provides for full admission of motive fluid substantially at the center of the turbine structure to an initial blade row of relatively very small diameter.

Problems other than those discussed above are also involved in providing a practical blade system for use in the manner which I contemplate. As I have explained above, a large volume of motive fluid must be expanded through initial turbine stages which are of relatively small diameter in a given turbine, and furthermore, the motive fluid must be expanded in a relatively highly efficient manner in these initial stages. In order to secure the desired results, the nature of the blading in a given turbine must be altered as compared with blading in a like turbine intended to expand steam. A highly important difference in the characteristics of the blading of the system is in the values of the outlet angles of the blades in the several stages relative to each other.

In accordance with one aspect of the present invention I overcome the difficulty that would be encountered if the usual practice were followed, by making the outlet angles of the blades in the first rows of blading substantially larger than is done in ordinary practice, and, generally speaking, expanding the motive fluid in the first portion of its path of expansion through blade rows or stages provided with blades the outlet angles of which are of progressively smaller value in successive stages or relatively small groups of stages. In any given turbine, the progressive decrease in the outlet angles of successive stages is not continued throughout the entire path of flow, the last row of blades in a turbine having a larger blade angle in order to reduce outlet losses, and one or more stages adjacent the last row in some instances also having larger blade outlet angles than intermediate rows immediately preceding them.

In accordance with another aspect of the invention I make use of turbine blading which is substantially different as to profile from the usual types of reaction turbine blade profiles. The blading which I prefer to employ in order to most advantageously secure the desired results comprises blades that are relatively very thick adjacent to the inlet side of a blade row, and the profile of the blading may be said to provide blades having bluntly rounded inlet edges with the thickness of the blades closely adjacent to the inlet edge of a blade row being at least a major portion of the maximum thickness of the blades. From the very greatly thickened inlet portions of the blades the blade profile provides an intermediate and an outlet portion gradually tapering to a sharp outlet edge.

The above described type of blade profile provides blades particularly well adapted for operation under the conditions of high temperature and mechanical stress imposed on the blading in a gas turbine system according to the present invention. The distribution of the mass of the metal in the blades with this profile provides greater structural strength than with the more usual blading profiles, and the bluntly rounded inlet edges are capable of withstanding the erosive effects of the high temperature motive fluid to a greater degree than are the relatively sharp inlet edges of the more usual profiles. More important than the foregoing, however, is the fact that with blades of the above described character the losses due to impact and eddies in the flow of motive fluid are reduced when these factors of loss are considered over a range of turbine speeds. Consequently, with this blading, a flatter efficiency curve is obtained than with other forms of blading. Due to the relatively flat character of the efficiency curve obtainable with this kind of blading it is possible to construct a turbine having a Parsons figure substantially below that figure corresponding to the maximum theoretically obtainable efficiency for reaction blading, without sacrificing to any material extent the efficiency actualy obtainable. Thus, for example, while the Parsons figure corresponding to the maximum theoretically obtainable efficiency with the usual blading is 3800, the above described kind of blading enables substantially maximum theoretically obtainable efficiency to be obtained in a turbine having a Parsons figure considerably below 3800, for example, a figure in the neighborhood of 3300. This in turn enables a turbine to be employed which will have the requisite high efficiency and which at the same time will have blading subject to less mechanical stress, or which will have fewer stages than a corresponding turbine of the same efficiency and with blading having the usual kind of blade profile.

Figure 3:
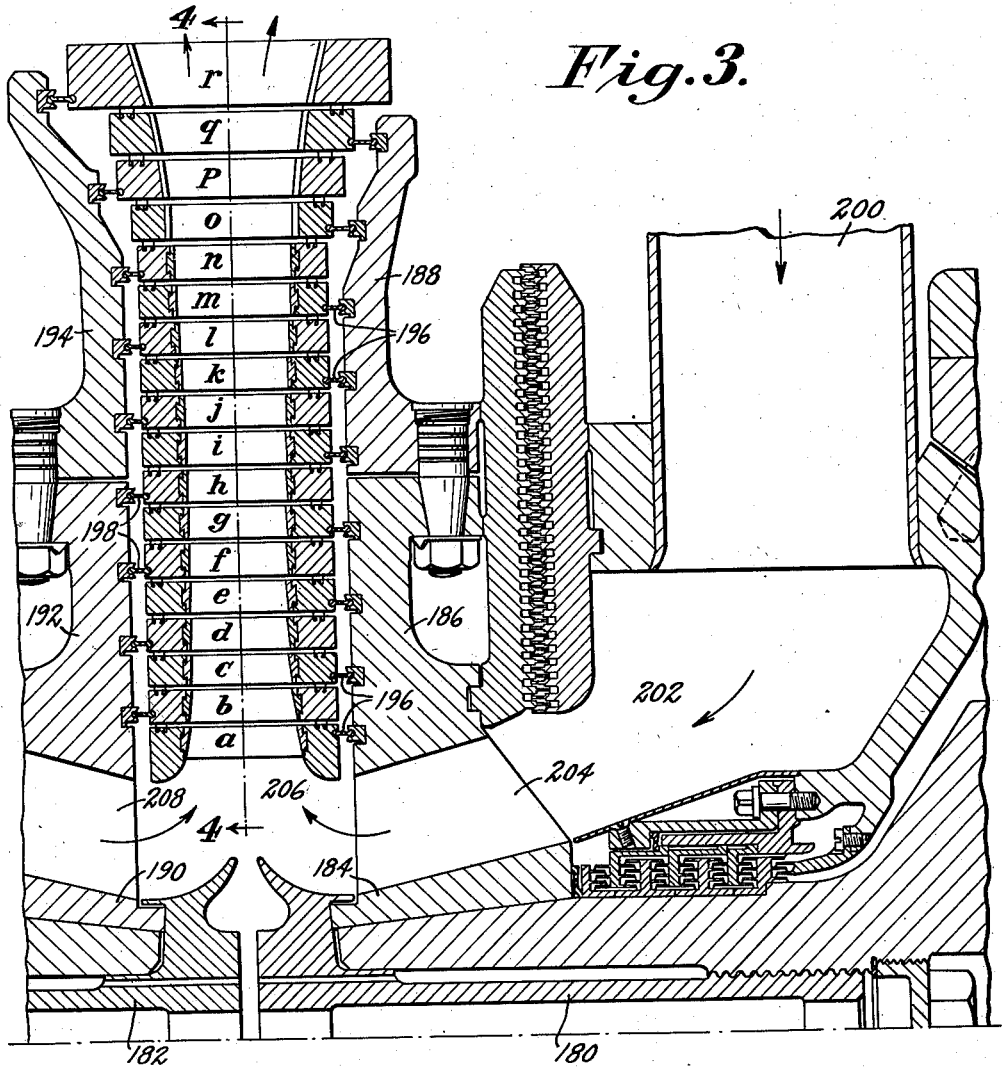
Fig. 3 is a section on enlarged scale of a part of one form of turbine advantageously employed in the exercise of the invention.
Figure 4:
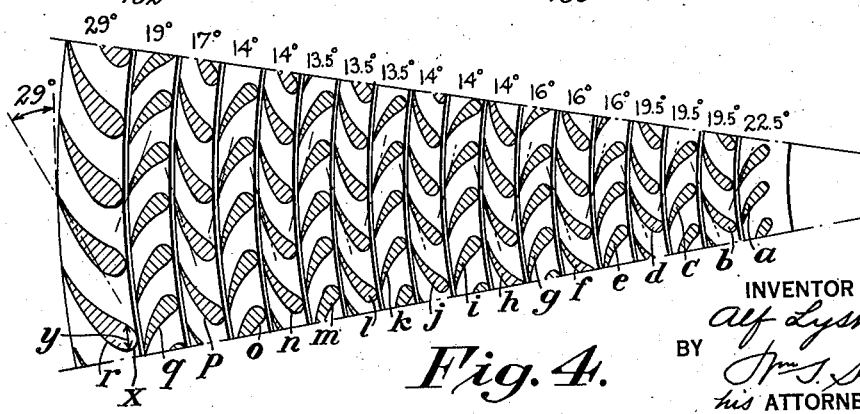
Fig. 4 is a section taken on the line 4—4 of Fig. 3.

The turbine system illustrated in Fig. 1 is suitable for a plant of approximately 16,000 kilowatts output, and in order to further illustrate the factors of blade construction and arrangement hereinbefore discussed, I have shown in Figs. 3 and 4, on an enlarged scale, the blade system for a turbine of the double rotation radial flow type which is diagrammatically illustrated in Fig. 1, and of a design suitable for use in a system such as that shown in Fig. 1.

Referring now to these figures, reference numerals 180 and 182 designate respectively the oppositely rotating shafts of the turbine. Shaft 180 has fixed thereto the turbine rotor 184 comprising inner and outer disc parts 186 and 188 respectively. Shaft 182 has mounted thereon a rotor 190 which is composed of the disc parts 192 and 194. Connected to the discs 186 and 188 by expansion rings 196 are a plurality of rings of turbine blades which are designated by the reference characters $a$, $c$, $e$, etc. Connected to the rotor discs 192 and 194 by similar expansion rings 198 are the rows of turbine blades $b$, $d$, $f$, etc. Motive fluid is admitted to the turbine through an inlet conduit 200 to a chamber 202, from which it passes through ports or openings in the rotor 184, one of which openings is shown at 204, to the central chamber of the turbine 206. Motive fluid also is admitted from a second inlet conduit (not shown) at the opposite side of the turbine through the ports in rotor 190, one of which ports appears at 208, to the central admission chamber 206.

In the turbine illustrated eighteen rows of blades are provided, and from Fig. 4 it will be evident that in the first portion of the path of expansion for the motive fluid the outlet angles of the blades in the different stages are relatively large and decrease progressively in the direction of flow of the motive fluid. The outlet angles of the several blade rows have been indicated in the figure adjacent to the several rows, and as shown in the drawings the blades in the first row have an outlet angle of 22.5°; the blades in the three next succeeding rows have an outlet angle of 19.5°; the blades in the three next succeeding rows have an outlet angle of 16°; in the three next succeeding rows 14°, and in the next three succeeding rows 13.5°. From this point on the last five rows at the outlet end of the blade system are formed with blades having outlet angles which increase slightly until the last row is reached, where a materially larger outlet angle is employed in order to reduce outlet losses. This particular turbine is designed for operation with motive fluid admitted to the turbine at a pressure of 21.0 kg./cm.$^2$, and with an initial temperature of 800° C. absolute. The mean diameter of the first row of blades is 184 millimeters and the mean diameter of the last row of blades is 575 millimeters. The normal operating speed of the turbine, that is, the normal absolute speed of each of the turbine shafts, is 3000 R. P. M. Motive fluid is exhausted from the turbine to atmosphere, and the value of the adiabatic heat drop of the motive fluid in passing through the turbine is 144.7 kg. calories. The sum of the squares of the blade speeds divided by the adiabatic heat drop gives a Parsons figure for the turbine of 3305. With a blade system of this character, a thermo-dynamic efficiency well above 80% may be obtained, and at the same time the character of the structure comprising the blade system is such that it is capable of continuously withstanding, without undue deterioration, the temperature and mechanical stresses imposed by operation with motive fluid admitted at the temperature and pressure indicated above.

Fig. 4 also illustrates the character of the blade profile hereinbefore discussed, and from this figure it will be evident that the blades have very bluntly rounded inlet edges as indicated at $x$, and that the thickness of the blades $y$ closely adjacent to the inlet edges of the blade rows is itself a major portion of the maximum thickness of the blades.

It is to be noted that in addition to all of the various characteristics which have already been discussed, and which contribute to the obtaining of the desired results, the arrangement of the component parts of a system in accordance with the invention is such that the flow of the gaseous media comprising the medium compressed and the motive fluid flows from the inlet of the compressing apparatus to the final exhaust of the turbine apparatus through conduits which are open and normally unregulated. This contributes materially to the obtaining of the desired overall efficiency of the system, since it avoids all the losses incident to throttling of the gaseous fluid.

In this connection it is to be understood that the invention is herein described and claimed only with reference to operation under the conditions which the system is expected and designed to meet in its normal operation and that the invention does not exclude the employment of emergency control apparatus for protecting the system against damage or destruction owing to load or other conditions of abnormal or emergency nature, the operation of which emergency apparatus may interrupt or otherwise affect the free flow of fluid which is characteristic of the normal operation of the system.

All normal load variations for which the system is designed can be and are compensated for by controlling the amounts of liquid fuel supplied and the amount of water supplied in cases of systems employing water injection, and the variations in these supplies may be effected without introducing losses which would be caused if regulation were effected through throttling. In systems in which water injection is not employed and the initial temperature of the motive fluid is maintained at sufficiently low value by the burning of fuel in the presence of a substantial quantity of excess air, the necessary regulation may be effected through control of the fuel supply alone, and those losses incident to throttling of the gaseous motive fluid are avoided.

A further important consideration in carrying the present invention into effect is the forming of the hot motive fluid in combustion chamber apparatus separate from the turbine means. By using combustion chamber apparatus separate from the turbine means, it is possible to provide the necessary combustion chamber volume for efficient combustion, and it is also possible with such apparatus to supply motive fluid for initial expansion which has homogeneous temperature characteristics. The gases in the zone of actual combustion and adjacent thereto are not of uniform temperature, and if combustion gases are to be successfully employed in high efficiency turbine blading, the high temperature motive fluid must be of substantially homogeneous characteristic. If the temperature characteristic is not homogeneous, the admission of portions of the motive fluid at temperatures above those at which the blading is adapted to operate, will seriously damage the blading and will, in any event, tend to shorten its useful life. This necessity for admission to the turbine blading of a motive fluid having homogeneous temperature characteristics definitely precludes formation of the hot motive fluid by internal combustion within the turbine apparatus itself and in immediate communication with the inlet of the turbine blading.

In order to explain the invention, I have chosen for illustration two systems of relatively simple nature, but it is to be understood that the invention may be incorporated in gas turbine systems having different numbers and arrangements of component parts. Thus, for example, systems within the scope of the invention may include a plurality of power output turbines and a larger number of compressor turbines than are employed in the examples hereinbefore described.

Other changes and modifications may also be made within the scope of the invention, which is to be understood as embracing all that may fall within the scope of the appended claims.

The disposition of the separate compressor and useful power turbines in the system, with reference to the flow of compressed air and motive fluid through the system, shown in Fig. 1 hereof but not herein claimed, is included in the subject matter claimed in my copending application Serial No. 51,230, filed November 23, 1935.

What I claim is:

1. A gas turbine system of the continuous combustion type comprising turbine means, power output means driven by said turbine means, and means for continuously supplying to said turbine means heated gaseous motive fluid comprising products of combustion, said turbine means including a blade system providing a path for expansion of motive fluid having a substantial component for flow of motive fluid in radially outward direction and an admission chamber for full admission of motive fluid to the blade system, said blade system including a plurality of stages of high efficiency reaction blading for progressively extracting in each successive stage a relatively small portion of the total available heat of the motive fluid and said blade system being constructed to operate with at least 80% thermodynamic efficiency, and said means for supplying motive fluid including compressor means driven by said turbine means for compressing a gaseous fluid to be expanded in said blade system, combustion chamber means separate from the compressor means and the turbine means for heating said fluid, conduits arranged for continuous free flow of the compressed fluid from the compressor means to the combustion chamber means and for continuous free flow of the heated and compressed motive fluid from the combustion chamber means to the admission chamber of said blade system, and means for controlling the temperature of the motive fluid to provide an initial temperature thereof within a range the lower limit of which is approximately 800° C. absolute and the upper limit of which will permit continuous full admission of said motive fluid at substantially its initial temperature to the inlet blading of said blade system and expansion of said motive fluid in said blade system without destruction of the moving blading thereof due to excessive temperature.

2. A gas turbine system of the continuous combustion type comprising turbine means, power output means driven by said turbine means, and means for continuously supplying to said turbine means heated gaseous motive fluid comprising products of combustion, said turbine means including a blade system providing a path for expansion of motive fluid having a substantial component for flow of motive fluid in radially outward direction and an admission chamber for full admission of motive fluid to the blade system, said blade system including a plurality of stages of high efficiency reaction blading for progressively extracting in each successive stage a relatively small portion of the total available heat of the motive fluid and said blade system being constructed to operate with at least 80% thermodynamic efficiency, and said means for supplying motive fluid including compressor means driven by said turbine means for compressing a gaseous fluid to be expanded in said blade system, combustion chamber means separate from the compressor means and the turbine means for heating said fluid, conduits arranged for continuous free flow of the compressed fluid from the compressor means to the combustion chamber means and for continuous free flow of the heated and compressed motive fluid from the combustion chamber means to the admission chamber of said blade system, and means for controlling the temperature of the motive fluid to provide an initial temperature thereof within a range the lower limit of which is approximately 800° C. absolute and the upper limit of which is of the order of 1000° C. absolute.

3. A gas turbine system of the continuous combustion type comprising turbine means, power output means driven by said turbine means, and means for continuously supplying to said turbine means heated gaseous motive fluid comprising products of combustion, said turbine means including a blade system providing a path for expansion of motive fluid having a substantial component for flow of motive fluid in radially outward direction and an admission chamber for full admission of motive fluid to the blade system, said blade system including a plurality of stages of high efficiency reaction blading for progressively extracting in each successive stage a relatively small portion of the total available heat of the motive fluid and said blade system being constructed to operate with at least 80% thermodynamic efficiency, the number and diameters of the stages of blading and the normal speed of operation of the turbine means providing for the turbine means a Parsons figure for the turbine means of the order of at least 3000 when expressed in metric units, and said means for supplying motive fluid including compressor means driven by said turbine means for compressing a gaseous fluid to be expanded in said blade system, combustion chamber means separate from the compressor means and the turbine means for heating said fluid, conduits arranged for continuous free flow of the compressed fluid from the compressor means to the combustion chamber means and for continuous free flow of the heated and compressed motive fluid from the combustion chamber means to the admission chamber of said blade system, and means for controlling the temperature of the motive fluid to provide an initial temperature thereof within a range the lower limit of which is approximately 800° C. absolute and the upper limit of which will permit continuous full admission of said motive fluid at substantially its initial temperature to the inlet blading of said blade system and expansion of said motive fluid in said blade system without destruction of the moving blading thereof due to excessive temperature.

4. A gas turbine system of the continuous combustion type comprising turbine means, power output means driven by said turbine means, and means for continuously supplying to said turbine means heated gaseous motive fluid comprising products of combustion, said turbine means including a blade system providing a path for expansion of motive fluid having a substantial component for flow of motive fluid in radially outward direction and an admission chamber for full admission of motive fluid to the blade system, said blade system including a plurality of stages of high efficiency reaction blading for progressively extracting in each successive stage a relatively small portion of the total available heat of the motive fluid, said blade system being constructed to operate with at least 80% thermodynamic efficiency, and said blade system including rows of blades adjacent to the inlet end of the system having relatively very thick and bluntly rounded inlet edges and having outlet angles generally decreasing in value in the direction of flow of motive fluid through the system, the number and diameters of the stages of blading and the normal speed of operation of the turbine means providing for the turbine means a Parsons figure of the order of at least 3000 when expressed in metric units and means for supplying motive fluid including compressor means driven by said turbine means for compressing a gaseous fluid to be expanded in said blade system, combustion chamber means separate from the compressor means and the turbine means for heating said fluid, conduits arranged for continuous free flow of the compressed fluid from the compressor means to the combustion chamber means and for continuous free flow of the heated and compressed motive fluid from the combustion chamber means to the admission chamber of said blade system, and means for controlling the temperature of the motive fluid to provide an initial temperature thereof within a range the lower limit of which is approximately 800° C. absolute and the upper limit of which will permit continuous full admission of said motive fluid at substantially its initial temperature to the inlet blading of said blade system and expansion of said motive fluid in said blade system without destruction of the moving blading thereof due to excessive temperature.

5. A method of generating power in a gas turbine system of the continuous combustion type which comprises continuously compressing a gaseous combustion-supporting fluid, continuously heating the compressed fluid by combustion under conditions producing a gaseous motive fluid comprising products of combustion, transforming heat energy of the motive fluid into mechanical energy with at least 80% thermodynamic efficiency by expanding the motive fluid in a plurality of stages of high efficiency reaction turbine blading of generally increasing mean diameter from the inlet toward the outlet of the turbine of which said blading forms a part and providing a path of flow having a substantial component of flow in radially outward direction from a relatively small diameter inlet to a relatively large diameter outlet, maintaining the temperature of said motive fluid at the place of initial expansion thereof within a controlled range the lower limit of which is approximately 800° C. absolute and the upper limit of which permits continuous full admission of the motive fluid to said blading without destruction of the moving blades due to excessive temperature, and admitting said motive fluid to said blading with full admission for expansion therein.

6. A method of generating power in a gas turbine system of the continuous combustion type which comprises continuously compressing a gaseous combustion-supporting fluid, continuously heating the compressed fluid by combustion under conditions producing a gaseous motive fluid comprising products of combustion, transforming heat energy of the motive fluid into mechanical energy with at least 80% thermodynamic efficiency by expanding the motive fluid in a plurality of stages of high efficiency reaction turbine blading of generally increasing mean diameter from the inlet toward the outlet of the turbine of which said blading forms a part and providing a path of flow having a substantial component of flow in radially outward direction from a relatively small diameter inlet to a relatively large diameter outlet, maintaining the temperature of said motive fluid at the place of initial expansion thereof within a controlled range the lower limit of which is approximately 800° C. absolute and the upper limit of which is of the order of 1000° C. absolute, and admitting said motive fluid to said blading with full admission for expansion therein.

ALF LYSHOLM.